United States Patent [19]

Dougherty

[11] Patent Number: 5,149,605
[45] Date of Patent: Sep. 22, 1992

[54] DUAL LUG BATTERY PLATE CONSTRUCTION

[75] Inventor: Thomas J. Dougherty, Waukesha, Wis.

[73] Assignee: Globe-Union Inc., Milwaukee, Wis.

[21] Appl. No.: 760,930

[22] Filed: Sep. 17, 1991

[51] Int. Cl.$^5$ ............................................. H01M 2/24
[52] U.S. Cl. ..................................... 429/160; 429/161; 429/178; 429/211
[58] Field of Search ................. 429/160, 161, 178, 211

[56] References Cited

U.S. PATENT DOCUMENTS

| | | | |
|---|---|---|---|
| 1,126,671 | 11/1911 | Wilson | 429/211 X |
| 1,336,127 | 4/1920 | Carpenter | 429/161 |
| 1,600,083 | 1/1925 | Webster | 429/211 |
| 1,947,473 | 12/1929 | Huebner | 429/211 |
| 2,906,804 | 9/1959 | Rigsby, Sr. | 429/178 X |
| 2,942,055 | 6/1960 | Doyle et al. | 429/178 X |
| 3,808,054 | 4/1974 | Wheadon et al. | 136/64 |
| 4,780,379 | 10/1988 | Puester | 429/160 X |
| 4,800,142 | 1/1989 | Bish et al. | 429/160 X |

Primary Examiner—John S. Maples
Attorney, Agent, or Firm—Foley & Lardner

[57] ABSTRACT

The present invention relates to a unique battery arrangement including battery plates having a pair of spaced apart battery lugs for both the positive and negative plates. While being spaced apart, the lugs are located generally adjacent one top edge of the plates; on opposite sides for the positive and negative plate constructions. The straps used to electrically connect the lugs are lower in height than those used on current battery designs, providing excellent current collection, efficient fusion with smaller lugs and resistance to vibration caused by separation of the lugs from the straps. The present invention also features plates having greater plate surface area, improved current carrying capability and reduced voltage drop. A weld element couples straps of like polarity, and in the preferred embodiment, at least a portion of the weld element is located intermediate the ends of the straps.

9 Claims, 3 Drawing Sheets

DUAL LUG BATTERY PLATE CONSTRUCTION

BACKGROUND OF THE INVENTION

1. Field of the Invention

The present invention relates generally to the art of batteries and more particularly to the art of batteries of the lead-acid variety which include a number of plates in each battery cell, the plates of like polarity being joined to one another by current carrying straps. Still more specifically, the present invention relates to such batteries which have increased plate area and reduced strap height.

2. Description of the Prior Art

The tendency in battery construction in the early 1990's is to have a lower overall battery height. With the increasing use of lower profile batteries and with the advent of immobilized systems, it is important to reduce the head space to the maximum extent possible in designing batteries. A reduction in head space can result in an increase in plate height, thereby increasing the plate surface area. In a most optimum system, it would be desirable to have the plate area increase of the individual plates reach a high enough level so that one or more plates could be dropped from each cell, thereby allowing for wider plates than those used in current battery design.

In immobilized battery systems, the need also exists to reduce the empty space over the top of the plates, commonly referred to as the head space. Numerous attempts have been made to accomplish this objective, all without a desirable level of success.

Several patents disclose systems which incorporate, at first glance, some of the elements of the battery construction of the present invention. For example, in U.S. Pat. No. 1,126,671 issued to Wilson on Jan. 26, 1915 for "Storage Battery", a battery system is described in which two distributing bars are provided at widely spaced apart locations on a positive battery plate. Collector straps are joined to the distributor bars, the straps being separate elements, spaced apart from one another by the collector strap for the negative plates. In the disclosed design, the negative plate has a single distributor bar located at approximately its midpoint. There is no teaching or suggestion in Wilson of using low profile straps to contact plural lugs for the reduction of head space or strap height.

Another system involving a pair of lugs is disclosed in U.S. Pat. No. 1,336,127 issued Apr. 6, 1920 to Carpenter for "Terminal Means For Battery Plates". In this design, a pair of lugs is provided for the battery plates, the lugs extending upwardly and being directed toward one another so that their upper edges are arranged at an angle to one another. A single trapezoidally shaped strap is placed between the lug upper surfaces and is joined thereto by melted lead to complete the connection. There is no indication in the Carpenter patent that the lugs and strap arrangement results in either reduced head space, plate area increase or strap height reduction.

Another patent disclosing two lugs on positive battery plates is U.S. Pat. No. 1,069,809 issued Aug. 12, 1913 to Prince for "Storage Battery". In this construction, the lugs are located at the opposite upper corners of the plate and are located at those locations to equalize current density.

A different multi-lug system is described in U.S. Pat. No. 1,600,083 issued Sep. 14, 1926 to Webster for "Electric Storage Battery". In this design, the original plate is constructed with as many as three lugs, two of which are shown extending upwardly from the top of one plate. However, in this device, the multiple lugs are provided for flexibility in battery design and two of the three described lugs are removed, depending upon which design alternative is selected.

In U.S. Pat. No. 1,947,473 issued Feb. 20, 1934 to Huebner for "Storage Battery", two short lugs extend from the upper portion of the battery, but according to the description only a single lug is used. It is apparent that the grid construction provides one lug which is used with the positive connector strap and a second lug which is used for the negative strap collector.

Yet another patent disclosing a plurality of lugs for a battery grid is U.S. Pat. No. 3,808,054 issued Apr. 30, 1974 to Wheadon, et al for "Wound-Wire Storage Battery Grid". In this patent, continuous lengths of a plurality of wires are formed into grid segments and are wound with one another, with the wires periodically being gathered into lug forming nested loops. The wires extend in a fan-like array therefrom. While the patent is silent with regard to the use of these lugs, it would appear that if two such gathered lugs exist on a single grid, one would be used for attachment of the positive strap and an adjacent plate would employ the other lug for the negative collector strap.

None of the foregoing patents disclose or suggest solutions to the problems discussed initially in this section of the specification. None of the patents indicate that the size of the grid can be expanded by using two lugs connected with collector straps which are joined at a single weld or that the overall height of the straps can be lowered. Moreover, there is no suggestion that using collector straps which are placed over and fused with dual lugs can efficiently reduce vibration failure. A system which overcomes the disadvantages of the prior art and provides the improvements noted in the beginning portion of this section of the specification would represent a significant advance in the art.

SUMMARY OF THE INVENTION

It is a primary feature of the present invention to provide a plate construction for use in batteries which overcomes the aforementioned disadvantages of the prior art. This principal feature includes numerous subfeatures which are generally advantageous. One of such features is the ability to reduce the head space in a battery.

Another of such features is the ability to reduce strap height, thereby reducing overall battery height.

Another feature of the present invention is to provide a plate arrangement which, together with the connector straps, provides increased resistance to vibration-induced breakage leading to battery failure.

Yet a further feature of the invention is providing a battery plate which has increased size resulting from, inter alia, the reduced head space, thereby permitting more paste area per plate, and in some battery designs, permitting the elimination of a plate and the substitution of thicker plates within the same compartment area.

A still further feature of the present invention is a battery plate configuration which permits maximum current collection capabilities, leading to improved current carrying and reduced voltage drop.

How these and other features of the invention are accomplished will be described in the following detailed description of the preferred embodiment, taken in conjunction with the FIGURES. Generally, however, the objects are accomplished by providing a battery plate constructed of lead, a lead alloy, a conductive plastic or another suitable material known in the battery art for preparing plates, wherein a pair of comparatively short lugs are provided at the top of the plate near to, but spaced apart from one another. Connecting straps couple the dual lugs to a single weld element which can be located between rather then above the straps. Using two straps for each plate reduces the probability of vibration-induced loss of electrical contact since current can pass to the weld through either lug. By using lower profile straps and by the rearrangement of the weld, head space requirements are minimized. In the most preferred embodiment, it is envisioned that an increase in plate height could range between about ⅛ to ¼ of an inch, yielding as much as an 8% overall increase in plate surface area. This type of reduced head space is especially beneficial in immobilized battery designs which provide higher power.

Further ways in which the features described above are accomplished in the present invention will become readily apparent to one skilled in the art after the present specification has been read and understood. Such other ways are deemed to fall within the scope of the present invention, especially if they fall within the scope of the claims which follow.

DESCRIPTION OF THE DRAWINGS

In the various drawings, like reference numerals are used to denote like components.

DETAILED DESCRIPTION OF THE PREFERRED EMBODIMENT

Figure 1:
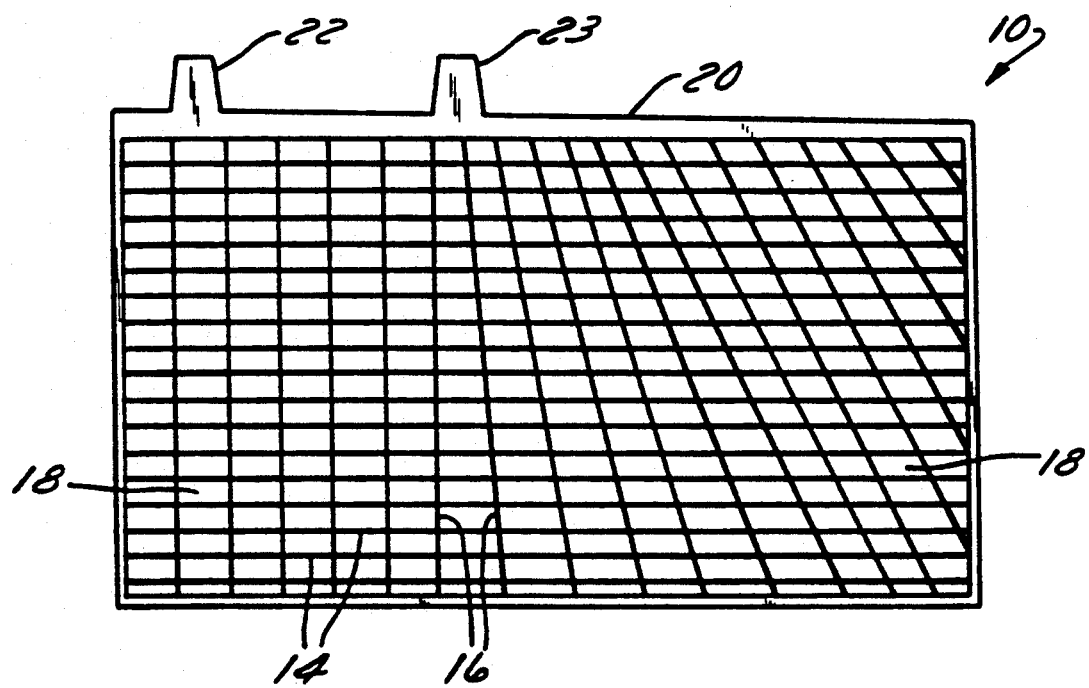
FIG. 1 is a front elevational view of a battery plate, in an unpasted condition, according to the most preferred form of the present invention.

Before proceeding to the detailed description of the preferred embodiment, several general comments need to be made concerning the invention. First, while the present invention will be illustrated in connection with plates prepared from lead or a lead alloy, as is generally known in the battery art, the material used for the construction of the plate is not critical to the present invention. Any suitable material known to the lead-acid and related battery arts which employ current collecting plates, can be used in the present invention. Furthermore, the particular configuration of the grid itself is not a limitation of the present invention. In many instances, the plate is made in a uniform grid pattern, and in other instances various geometric configurations of grid components are employed. All of the known battery plate grid configurations could be suitably employed with the present invention.

For simplification in understanding the present invention, numerous components of a typical battery will not be shown in the drawings. These include the positive and negative paste materials which are added to the plates which are themselves the subject of this specification. Numerous references disclose the types of materials which can be used and their method of preparation and application. Accordingly, in and of themselves, the paste compositions are not part of the present invention. Also not described or shown in detail is the electrolyte system, typically sulfuric acid, which is used in such battery systems. In addition, the battery housing, typically made of a resin material such as polyvinylchloride, recycled plastics or the like, will not be described in detail.

Finally, the overall size and shape of the battery can vary widely, depending upon the required voltage and amperage for a particular application. As an example of the type of information which is not shown in detail here, reference could be made to a typical automobile battery which includes six two-volt cells to provide an overall 12-volt battery. Within each cell, a grouping of positive and negative battery plates, and separators, are employed, with the typical configuration including one more positive plate than the number of negative plates. The relevance of this discussion to the present invention is that in some of these applications, due to the increase in surface area provided by the unique plate construction, it may be possible to eliminate one or more plates and yet provide increased battery capacities as compared with earlier designs. Terminals are typically provided at opposite ends of the battery and partition walls separate the cells, except for molds made through the wall coupling collector straps in adjoining cells.

Proceeding now to a description of the most preferred embodiment of the present invention, a plate 10 according to the present invention is shown to be generally rectangular in configuration, having a solid periphery defining a plurality of horizontal grid forming elements 14 and a plurality of vertical or inclined grid elements 16. The spaces between the elements 14 and 16 define openings 18 through the plate which assist in the bonding of the paste material (not shown) to the various grid elements, it being typical in the battery art to provide a layer of paste on both sides of plate 10, with the layers being interconnected through openings 18. By way of example, but certainly not by way of limitation, plate size could be about 7 inches long and 4 inches high.

Also shown in FIG. 1 is the inclining of certain of the elements 16 from the lower right portion of the plate toward the top, one known grid configuration that has been found to be desirable in increasing the current collecting ability of the plate. The number of grid elements 14 and 16, and the sizes of the openings 18, can vary widely, as can the pattern and plate sizes. It should also be noted in FIG. 1 that plate 10 includes a top edge 20 that slopes downwardly slightly from left to right, the slope being approximately ¼ inch, although the amount could be increased or decreased. This feature is primarily to facilitate plate manufacture and certainly is not a requirement for plates made according to the present invention.

Referring next to the upper left of plate 10 in FIG. 1, a pair of collector lugs 22 and 23 are shown. Lug 22 is located near the upper left corner of plate 10, while lug 23 is spaced apart therefrom toward the center. The distance separating the lugs is not critical, but both should be on the same side (in this case, the left side) of the plate and should be generally near one another so that the collector straps shown and described later need not be excessively far apart. Lugs 22 and 23 are lower in height than conventional SLI automobile battery collector lugs and provide excellent current collecting capabilities for the plate 10. A spacing of about 2 inches (from lug center to lug center) would represent an exemplary separation. The lug shape is also not critical, but the truncated rhomboid shape illustrated in the FIGURES desirable and the best shape known to me at the time of this application.

Figure 2:
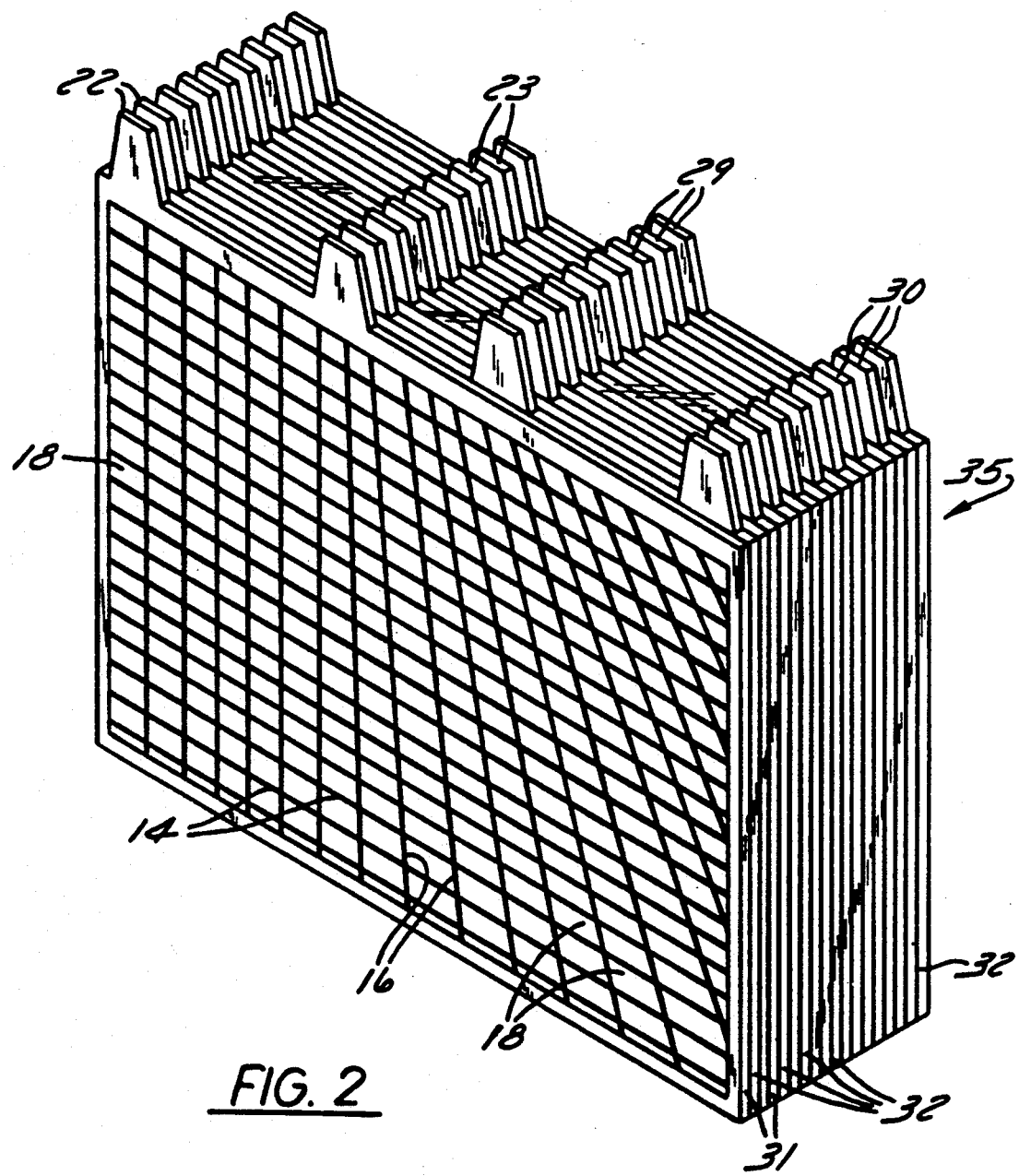
FIG. 2 is a perspective view of a plurality of plates as shown in FIG. 1.

Referring next to FIG. 2, a schematic, eighteen plates 10 are shown as they would be located in a battery plate stack. The negative plates 31 are as illustrated in FIG. 1. In this FIGURE, a pair of positive plate collector lugs 29 and 30 are shown on the right side of the alternating positive plates 32. Note that the tops of all of the lugs 22, 23, 29 and 30 are in the same plane when the plates are stacked. In FIG. 2, the eighteen plates could be considered a typical cell stack 35 for an automobile-type battery, although the number of plates can vary widely, even for that application.

Figure 3:
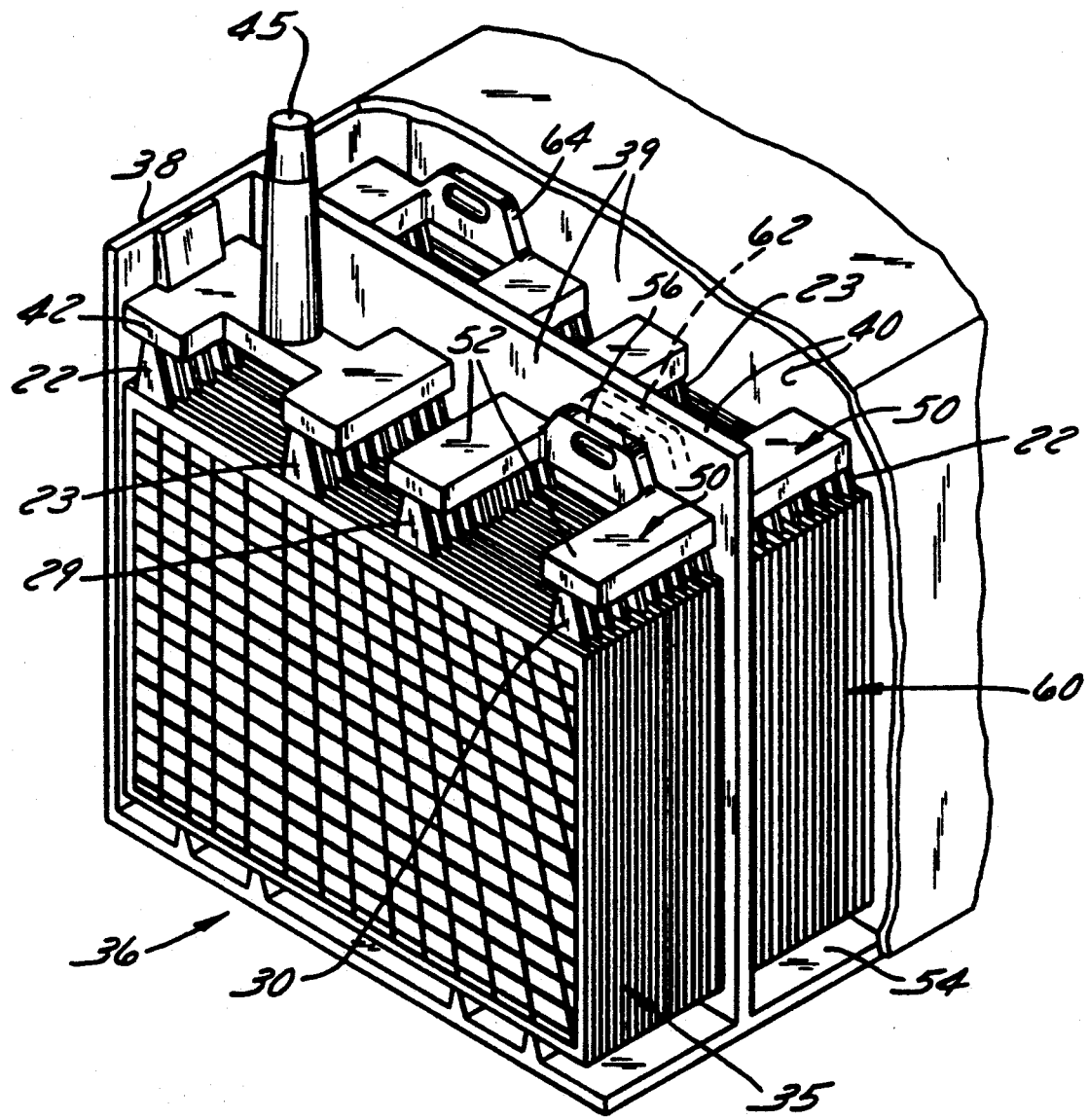
FIG. 3 is a perspective view of a battery, with portions cut away, employing plate stacks according to the present invention and illustrating weld and terminal elements thereof.

FIG. 3 illustrates the cell stack 35 of FIG. 2 in a multi-cell battery 36. In this case the stack is an end stack, with the negative plates being coupled to a terminal and the positive plates being connected to plates in an adjoining cell as will be described more completely below. Battery 36 includes a casing 38 and a plurality of parallel divider partitions 40 separating the casing 38 into a plurality of cells 39. Six such cells would be found in a typical automobile battery, with the positive terminal (not shown) located at the opposite end. The forward end wall (not shown) of battery 36 has also been eliminated from this drawing for ease of explanation, as has the battery paste material.

Dealing first with the negative terminal component of battery 36, a generally H shaped collector strap 42 is shown fusing all of the negative collector lugs 22 and 23 of stack 35. As will readily be appreciated by those skilled in the art, straps are generally formed in a lead cavity and the plate stack is inverted and downwardly immersed into molten lead contained in the cavity. In this case, the cavity would be an H-shaped cavity so that the row of lugs 22 will be fused with one side of the "H", the row of lugs 23 will be fused with the other side, and so that the connecting portion of strap 42 will electrically couple the two sides. A negative, conductive terminal post 45 is formed with strap 42, or added thereto, to provide the coupling of the negative side of the battery 36 to the electrical system. The terminal 45 can be variously embodied and arranged, as is well known, and can be a post or a receptacle. It can also be arranged to extend upwardly through the top of the battery casing 38 or from the front top edge thereof, those being the most common terminal locations existing in today's batteries.

A similar terminal and strap (not shown) would be provided at the opposite end of battery 36, these components coupling the lugs 29 and 30 of the positive plates of the most remote plate stack.

The collector strap 50 for the positive plates of cell stack 35 comprises, in the illustrated embodiment, of a pair of elongate and parallel collector strap elements 52, preferably formed by the cavity immersion technique referred to above. However, because strap 50 will be welded to a second plate stack in the adjoining cell compartment 54, a weld element 56 is formed, or added, between strap elements 52 to electrically connect the two. The weld element 56 will be generally coplanar with and spaced above the last plate in the cell stack. In a most preferred embodiment, the weld element 56 is formed with the elements 52 and is located generally intermediate the upstanding lugs 29 and 30 and the end of elements 52. By employing this arrangement, in lieu of the prior art arrangement of locating the weld element on top of a single strap, one of the major advantages of the present invention is achieved, i.e. a reduced height for the battery, or for the same size casing 38, a lower head room requirement leading to the desirable design alternative of increased plate size. The second plate stack 60 is shown in cell compartment 54, it also being appreciated by those skilled in the art who have read this specification that a weld element 62 for that stack is electrically coupled to weld element 56 through the wall 40 separating the two cell compartments using welding techniques which are known to the art and which, in and of themselves, do not form part of the present invention. This weld couples the negative plates of stack 60 to the positive plates of stack 35. The positive plates of stack 60 would be coupled, using a weld element 64 to the negative plates of the third stack, etc., to provide the completed battery according to the present invention.

Because each plate is coupled to two straps, a more reliable battery is also provided since, if for any reason, electrical connection is lost between one lug and a strap, the other fusion is still available for carrying current from the plate to the weld element. Moreover, current collection is optimized and voltage drop is reduced.

An example of the magnitude of plate size increase which can result from the present invention is ½ to ¾ inch for a typical automobile battery application, corresponding to a plate area increase of about 8%. If, for example, a battery of prior design were compared for plate area purposes and such prior battery included 12–18 plates, at least one plate could be dropped from the stack while allowing the battery capacity to be either maintained or improved.

The alternate design choice, i.e. a reduction in the height of the battery itself, is very important as higher power batteries are being designed for applications where space is limited.

While the present invention has been described and illustrated in connection with a single preferred embodiment, the scope thereof is not to be limited by such description and illustration but is to be limited solely by the scope of the claims which follow. Certain equivalents will also appear to those skilled in the art, all of which are deemed to be within the scope of the present invention.

What is claimed is:

1. A battery apparatus including at least two battery plate stacks separated by a wall comprising:
   a plurality of plates in each stack, at least some of the plates including spaced apart, generally coplanar collector lugs, the collector lugs forming parallel rows of lugs;
   elongate collector straps electrically coupling the lugs in each row and a weld element electrically coupling the straps; and
   a weld element of each stack being electrically coupled to a weld element of an adjacent stack through said wall.

2. The apparatus of claim 1, wherein the plates are lead-acid battery plates and include positive and negative plates respectively pasted with positive and negative paste material.

3. The apparatus of claim 1, wherein at least a portion of each weld element is located intermediate the collector straps.

4. The apparatus of claim 1, wherein each plate comprises a conductive grid having the lugs extending therefrom.

5. A battery comprising a plurality of compartments and a battery plate stack in each compartment, the plate stacks being coupled to one another through walls forming the compartments by weld elements provided on each plate stack, the improvements comprising a reduced head room requirement above the plate stacks, improved protection against strap-lug coupling failures and improved current collecting ability resulting from a strap and weld configuration comprising:

a plurality of positive and negative plates in each plate stack, each plate including at least two generally coplanar and spaced apart collect lugs, parallel collector straps electrically connected to the lugs of like polarity plates and a weld element electrically coupled to the parallel straps, the weld element of one plate stack being electrically coupled to a similar element of a plate stack in an adjoining compartment.

6. The battery of claim 5, wherein at least a portion of the weld element is located below the plane defined by the upper surfaces of the collector straps.

7. The battery of claim 5 wherein the lugs of each plate are located on one side of the plate but are spaced apart from one another to reduce electrical resistance and enhance the current collecting ability of the straps.

8. The battery of claim 5 wherein one weld element of the plate stack in the end compartments of the battery is replaced by a terminal electrically coupled to the parallel straps joining the lugs of the plates of one polarity.

9. The battery of claim 8 wherein the terminal includes a first terminal strap electrically coupling the parallel collector straps and a terminal post electrically coupled to the terminal strap.

* * * * *